No. 11,779. Reissued Oct. 24, 1899.

A. FRESCHL.

APPARATUS FOR TUFTING CUSHIONS.

(Application filed June 28, 1899.)

Witnesses.
A. J. Bell.
Harry Flatow

Inventor
Alfred Freschl
By Josiah McRoberts.
his Atty.

UNITED STATES PATENT OFFICE.

ALFRED FRESCHL, OF CHICAGO, ILLINOIS.

APPARATUS FOR TUFTING CUSHIONS.

SPECIFICATION forming part of Reissued Letters Patent No. 11,779, dated October 24, 1899.

Original No. 620,070, dated February 21, 1899. Application for reissue filed June 28, 1899. Serial No. 722,190.

DIVISION B.

*To all whom it may concern:*

Be it known that I, ALFRED FRESCHL, of Chicago, in the county of Cook and State of Illinois, have invented certain new and useful Improvements in Apparatus for Tufting Cushions; and I do hereby declare that the following is a full, clear, and exact description thereof, reference being had to the accompanying drawings, and to the letters of reference marked thereon, which form a part of this specification.

This invention relates to an improved apparatus for making tufted cushions for use in upholstering; and the object of the invention is to simplify and lessen the cost of the apparatus used in the manufacture of such cushions.

The invention consists in the matters hereinafter set forth and more particularly pointed out in the appended claims.

Figure 1:
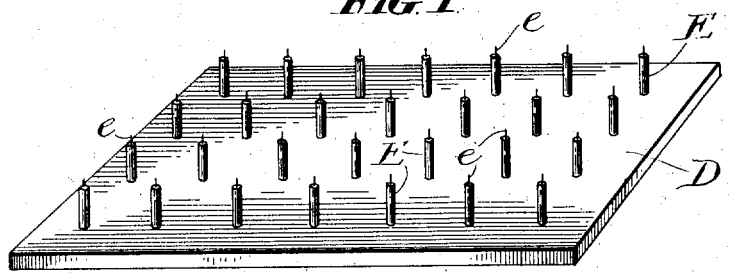
Figure 2:
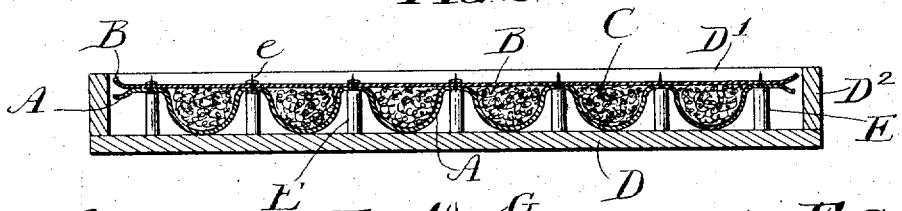
Figure 3:
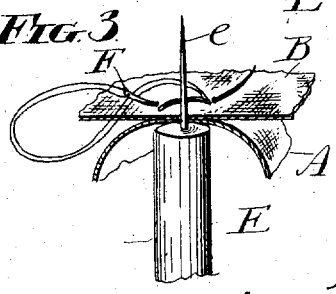
Figure 4:
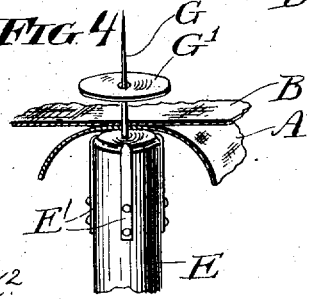
Figure 5:
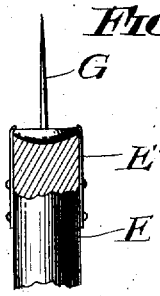
Figure 6:
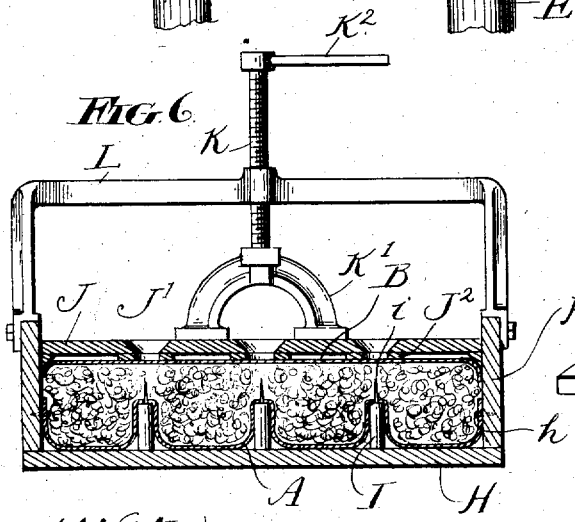
Figure 7:
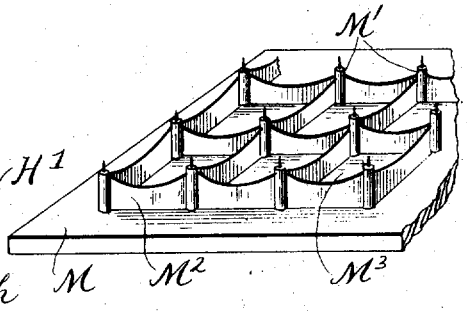

In the drawings, Figure 1 is a perspective view of one form of base over which the cushion is molded or formed by hand. Fig. 2 shows in sectional view the cushion in the mold or former before the same has been completed. Fig. 3 shows one means of securing the outer and inner coverings of the cushion together at the tufts. Figs. 4 and 5 illustrate details of another manner of securing said inner and outer covering together. Fig. 6 illustrates in longitudinal vertical section another form of apparatus for making cushions in accordance with my invention. Fig. 7 illustrates a modified form of the former or moldboard shown in Fig. 1.

A cushion which my invention is adapted to produce consists of an upper or outer covering A, of cloth, leather, or the like, a lower covering or backing B, of burlap, cardboard, or other suitable material, and a filling C, of hair, moss, or like material. Said filling is divided into a number of elevated rounded projections, the outer and inner coverings being secured together between said elevations at the base of the cushion, thereby forming on the outer surface of the cushion a plurality of depressions, in which are usually located buttons or tufts. The outer edges of the cushion will be finished in any manner to suit the use to which it is to be put.

First referring to the construction shown in Figs. 1, 2, and 3, D designates a base plate or board which may be of any desired form to correspond with the form of the cushion to be made thereon. Said base-board is provided with a plurality of upwardly-projecting posts E, which are spaced upon the upper surface thereof to correspond with the number and location of the depressions in the cushion and which are arranged opposite the points in the cushion in which the inner and outer coverings are secured together in tufting. Each of said posts is provided on its upper end with one or more pointed upwardly-projecting pins *e*. In practice the base-board D will form the bottom of an open-topped box having vertical side and end walls $D'$ $D^2$, respectively.

The method of making a cushion with the apparatus described is as follows: The flexible material forming the upper or outer covering A of the cushion is placed with its finished face downward on the base-board over the pins *e*. Said outer covering is then depressed or drawn downwardly in the spaces between the posts, which constitute, in effect, separate molds or pockets, thereby forming in the upper surface of said outer covering, between the posts E, a plurality of cells in which the filling C is to be pressed. Said outer covering A will desirably be previously provided with a plurality of apertures, through which the pins *e* are adapted to project, or provided on its inner surface with marks to indicate where the pins should pierce therethrough. With this arrangement said cover may be pressed down over all the pins at once and thereafter depressed between the posts to form the cells before the filling is begun. When the cells have been formed in the manner described, they will be severally filled by hand with the material used for this purpose, said filling being pressed into the cells to produce the required firmness in the cushion. Said cells may all be filled at once and the inner covering or backing B applied to the same and independently secured over the different cells, or each cell may be filled and the backing or inner covering secured thereover before filling the next adjacent cell, and so until all the cells are completed, any order in filling said cells being followed as most convenient to the operator. Said inner covering or backing when pressed down over the pins is in contact with the outer covering at the points opposite said posts, and the two coverings are secured or tufted together at said points of contact by any suitable tufting or attaching means. As shown in Fig. 3, said coverings are sewed together by a strong cord or thread, which is passed through both thicknesses of material and is inserted from the upper side thereof by means of a curved needle F. Instead of sewing, as described, the two layers or coverings may, however, be secured together by means of headed tufting nails or pins G passing through both coverings and through apertured disks or washers G', said nails or pins being clenched on one side thereof over said apertured disks or washers. When such tufting nails or pins are employed, they will be attached to the upper ends of the posts E, with their points directed outwardly and in extension of said posts. Said nails or pins will be secured upon the posts by any suitable means affording detachable connection, by which they will be held rigidly thereon and serve the same purpose as the pins *e*. When thus attached, said nails or pins G serve to hold the layers or covering in their proper relation before the covers are permanently secured together.

In Figs. 4 and 5 is shown one means for forming seats for detachably connecting the tufting-nails to the posts. Said posts are in this instance provided with a plurality of spring-arms E', which project beyond the ends of the posts and are curved inwardly in their projecting portions to embrace the heads of said nails with a yielding pressure. When said inner and outer coverings have been secured together in the manner described, the outer margins will be suitably finished to suit the use to which the cushion is to be put.

All of the operations of making a cushion by the use of the devices thus far described are performed by hand.

In Fig. 6 I have shown an apparatus in which the filling is pressed into the cells formed in the outer covering by mechanical means. In said figure, H designates the base of a former, and H' the side walls thereof. I designates upwardly-extending posts, provided at their upper ends with outwardly-directed pins *i*, said parts being similar to the corresponding parts of the construction hereinbefore described. The filling is pressed into the cells formed in the outer covering by means of a follower J, which is movable vertically between the walls H' of the former and fits closely therein. In the use of this apparatus the filling C is placed loosely upon the outer covering A after the cells have been formed therein, the box being filled by the filling material to a depth considerably greater than the depth of the cells, so that it will be packed to the required firmness when pressed into said cells. After the filling has been placed loosely in the box over the outer covering therein the inner covering or backing B is placed over the filling. The follower is then lowered upon said covering B, and power is applied thereto to force the same downwardly. Said follower is provided with a plurality of circular openings J', which are located opposite or vertically above the posts I, and through which the pins *i* project when the follower has been depressed sufficiently to carry or thrust said pins through the inner covering or backing B. Said follower is provided on its lower or inner side with a plurality of rings $J^2$, which surround said openings and project below the follower a slight distance, thereby forming a plurality of downwardly-directed flanges surrounding said openings. The purpose of said rings is to enable the opposite coverings A and B to be brought together at points above the posts with greater pressure than would be the case if the follower were in contact with the inner covering or backing throughout its entire area. Said outer covering may be tucked about the posts E, if desired, by the use of the tucking-peg shown in my prior patent, No. 592,508, granted to me October 26, 1897. Said follower is herein shown as operated by means of a screw-shaft K, which engages at its lower end a bearing-yoke K', resting upon the upper surface of the follower. Said shaft K has screw-threaded connection with a frame L, which is attached to the upper edges of the side walls of the former. Said shaft is provided at its upper end with a handle $K^2$, by which it may be rotated. Said inner and outer coverings A and B may be secured together at their points of contact by either of the means heretofore described—namely, by sewing or by a tufting-nail.

In Fig. 7 is shown a modification of the form of base-board for the former. Said board, which is designated by the letter M, is provided on its upper surface, between the upwardly-projecting posts M', (which latter may be provided either with the pins *e* or detachable tufting nails or pins G, above described,) with a plurality of strips $M^2$, which are set edgewise on the board, longitudinally and transversely thereof, and intersect each other at said posts, thereby forming on said base-plate a plurality of separate molds or pockets $M^3$, within which the outer covering of the cushion may be depressed to form the cells therein. Said pockets or molds enable the cells to be formed with greater accuracy than where said strips or partitions are absent. Said construction of the base-board may be used with the device shown in Fig. 2 as well as with that shown in Fig. 6.

The employment of the pins attached to the upwardly-projecting posts of the base of the former is of great importance, as it enables the outer covering of the cushion to be held in fixed relation upon the base-plate of the former while it is being depressed into the molds to form the cells for the filling. At the same time said pins hold said covering in position while the filling is being placed therein and while the inner covering or backing is being attached to said outer covering. The pins effectually prevent displacement of the parts while the cushion is being upholstered, as they are held against lateral movement or displacement. By the use of said pins, in connection with the posts described, the cells of the cushion may be independently and successively filled and the inner covering or backing attached thereto as each cell is filled when the device shown in Fig. 2 is employed. Moreover, this feature of the invention affords a construction which is exceedingly simple and cheap and greatly simplifies the operation of manufacturing such cushions, because it enables the material forming the outer surface of the cushion to be held in fixed relation upon the base-plate of the former while it is being depressed into the molds to form the cells for the filling and holds said covering in position while the filling is being placed therein and while the inner covering or packing is being attached to said outer covering without the necessity of using auxiliary holding devices for these purposes.

The use of the upwardly-projecting tufting-posts, which are attached directly to the base-plate of the former and provided at their outer ends with pins which are adapted to pierce the inner and outer coverings of the cushion and hold the same firmly in place during the operation of making the cushion, is of much importance, as it greatly simplifies the construction of apparatus and the operation thereof. With this construction the posts themselves serve to divide or separate the cells, thereby obviating the necessity of employing for this purpose separate tubes through which the tufting-nails or other fastening devices are inserted, as in prior devices of this character.

By employing a former or mold-board having a solid-bottomed or imperforate base-plate, to which the tufting or cell-forming devices are attached, the former itself performs the functions or offices for which heretofore it has been necessary to employ two separate and independent parts—to wit, the moldboard or former having openings surrounded with hollow or tubular tufting devices through which the tufting-pins pass and the pin-board upon which the tufting pins or nails are carried to force the pins through the material. The terms "imperforate" and "solid" are here used and employed to mean that the mold or former is not provided with passages for the tufting means.

By the use of an apparatus of the character described in the present application the tufting-pins are carried upon the moldboard or former itself, thereby dispensing with the heretofore necessary separate pin-board and cheapening and simplifying the construction of the moldboard itself and of the apparatus considered as an entirety.

Having thus described my invention, what I claim, and desire to secure by Letters Patent, is—

1. An upholstering apparatus comprising a former consisting of an imperforated base-plate and a plurality of outwardly-projecting tufting-posts attached rigidly to said plate, each of which is provided at its outer end with an upwardly-projecting pin held against lateral displacement and adapted to pierce both coverings of the cushion, a follower movable toward and from said former and provided with a plurality of openings opposite said posts through which the pins are adapted to project, and means for moving said follower toward said former.

2. A former, for making tufted cushions, consisting of a base-plate provided with a plurality of upwardly-projecting tufting-posts attached rigidly to said plate, each post being provided at its outer end with an upwardly-projecting, axially-arranged pointed pin adapted to pierce both layers of fabric, and a follower, movable toward and from said base-plate, provided with a plurality of openings arranged opposite said posts and much larger than the same, through which openings access may be had to the layers of fabric in contact with the ends of the posts, substantially as described.

3. A former for making tufted cushions consisting of a base-plate provided with a plurality of upwardly-projecting tufting-posts attached rigidly to said plate, each post being provided at its outer end with an upwardly-projecting, axially-arranged pointed pin adapted to pierce both layers of fabric, said pins being adapted to be detached from the posts to tuft the inner and outer layers of fabric together, and a follower movable toward and from said base-plate provided with a plurality of openings arranged opposite said posts and much larger than the same, through which openings access may be had to the fabric and the pointed pins, substantially as described.

4. An upholstering apparatus comprising a former consisting of a base-plate and a plurality of upwardly-projecting tufting-posts attached rigidly to said plate, each of which is provided at its outer end with an upwardly-projecting pin adapted to pierce both coverings of the cushion, a follower movable toward and from said former and provided opposite said posts with a plurality of openings through which said pins are adapted to project, said follower being provided on its under side around each opening with a flange surrounding said opening and projecting below the follower.

In testimony whereof I affix my signature in the presence of two witnesses.

ALFRED FRESCHL.

Witnesses:
JOSIAH MCROBERTS,
LYNDEN EVANS.